May 19, 1925.  1,538,481

E. R. GEWERT

VULCANIZER

Filed June 11, 1924  2 Sheets-Sheet 1

Edwin Rudolph Gewert
INVENTOR.

BY Clarence Perdew
ATTORNEY.

May 19, 1925.  1,538,481
E. R. GEWERT
VULCANIZER
Filed June 11, 1924  2 Sheets-Sheet 2

Edwin Rudolph Gewert INVENTOR.
BY
Clarence Perdew ATTORNEY.

Patented May 19, 1925.

1,538,481

UNITED STATES PATENT OFFICE.

EDWIN RUDOLPH GEWERT, OF CINCINNATI, OHIO.

VULCANIZER.

Application filed June 11, 1924. Serial No. 719,358.

*To all whom it may concern:*

Be it known that I, EDWIN RUDOLPH GEWERT, a citizen of the United States, and a resident of Cincinnati, Hamilton County, and State of Ohio, have invented certain new and useful Improvements in Vulcanizers, of which the following is a specification.

My invention relates to apparatus for repairing the casings of pneumatic tires by vulcanizing patches, or a partial or a whole new surface of rubber compound on the tread thereof, wherein the casing is clamped in a heated mold, and retained therein at a proper vulcanizing temperature for the time required to properly cure the rubber. One of the objects of my invention is to provide a single vulcanizing machine adaptable to a wide number of sizes of tire casings. Heretofore, it has been the customary practice to employ a battery of vulcanizing molds, of a number of different sizes, each size adapted to one, or at most two sizes of tire casings. In my invention, herein described and claimed, I am able to fit my apparatus to a wide variety of sizes of tire casings, ranging from the largest to the smallest, and thus perform, with one piece of apparatus, the work of a number of different sizes of molds. Another object of my invention is to provide means whereby the adjustment of the vulcanizer from a setting suited to any one size, may be quickly changed to an adjustment suited to any other size, whether the new size be smaller or larger than the casing for which it had been just previously employed. There are a number of vulcanizers, more or less adjustable for a variety of sizes of tire casings, but they are either complicated and expensive to manufacture, or they require a partial disassembly and bolting together again when making the change of adjustment from one size of tire to another, and have not the features of quick adaptability, simplicity and cheapness of manufacture which is characteristic of the invention described herein. Another characteristic of my invention, as compared with others designed with similar objectives in view, is that there is but one pair of steam connections to be broken when changing over, the connections to the hollow tread mold. My invention also comprises certain details of form and relations of component parts which will be set forth in the description of the accompanying drawings in which:

Figure 1:
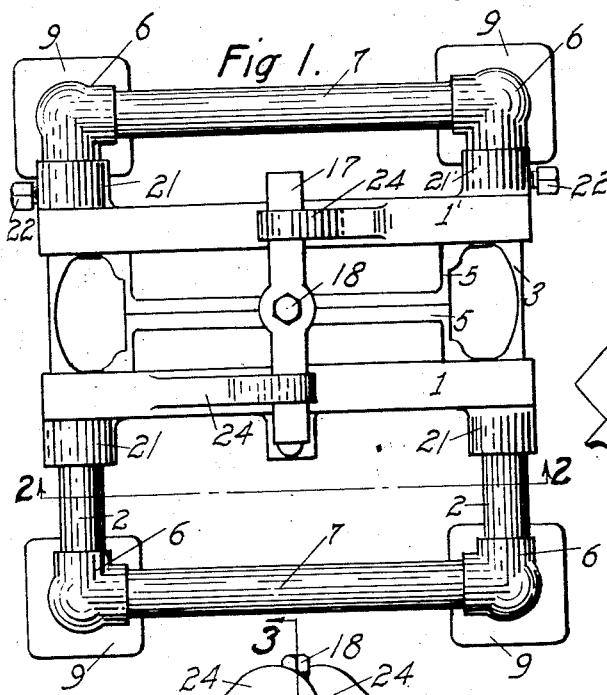
Fig. 1 is a plan view of the apparatus embodying my invention with the component parts adjusted to fit a tire casing of a size intermediate between the smallest and the largest.
Figure 4:
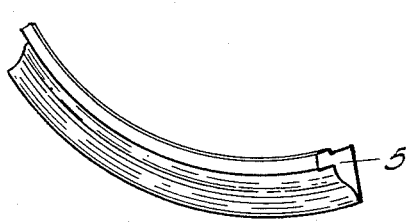
Fig. 4 is a perspective view of the upper portion of the removable center section, specifically known to the trade as a bead mold, and formed of two like parts, but one of which parts appears in the figure.

The accompanying drawings illustrate the preferred embodiments of my invention in which 1, 1' represent the hollow side walls, preferably of iron, having projecting bosses 21 thereon to receive the horizontal cylindrical members 2 of the supporting frame work. The side wall 1' is held in fixed relation to the frame work by means of the set-screws 22, the side wall 1 being slidably mounted on the members 2, to the end that it may move freely toward or away from the fixed side wall 1', the side wall 1 being guided by the members 2, that the walls 1, 1' are at all times parallel one to the other.

The side walls 1, 1' are further provided with ears 14, 14', projecting downward, the ear 14 being adapted to receive the cylindrical portion of the screw 4, and the ear 14', on the fixed side wall 1', being threaded interiorly to receive the threaded portion of the screw 4. This screw is provided with an enlargement or head 12 and a collar 13 pinned thereto, the head 12 and the collar 13 being adapted to prevent axial movement of the screw with relation to the ear 14, thereby compelling lateral movement of the side wall 1, when the screw 4 is turned by the handle 15, the said handle being loosely inserted in a suitable opening in the head 12 of the screw 4. This lateral movement of the side wall 1, due to the rotation of the screw 4 is similar to that of the movable jaw of a vise, which tool the apparatus somewhat resembles.

Figure 3:
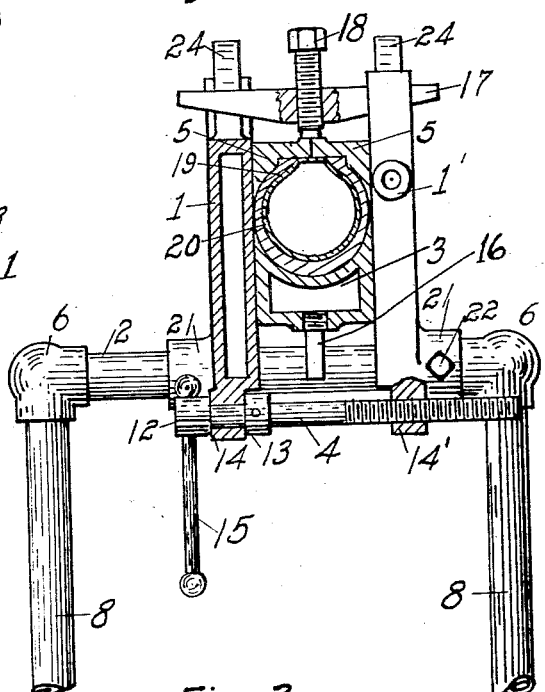
Fig. 3 is a detailed end elevation, showing one side and a portion of the center in section along the line 3—3 of Fig. 2, and showing the lower portion of the vulcanizer, the tread mold, held tightly between the side walls by means of the vise-like screw.

Integral with the side walls 1, 1' there are cast the lugs or hooks 24, adapted to receive the clamp 17 and, by means of the screw 18, the bead molds 5, 5 are forced vertically downward against the beads of the tire casing 19, Fig. 3, pushing the casing against the inner surfaces of the side walls 1, 1' and downward against the inner surface of the tread mold 3.

Figure 5:
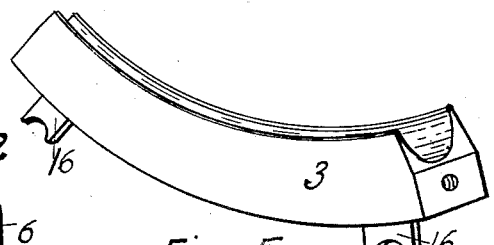
Fig. 5 is a perspective view of the lower hollow section of the vulcanizer, the tread mold, and showing the lugs by which it is supported centrally and at the proper height when between the side walls.
Figure 2:
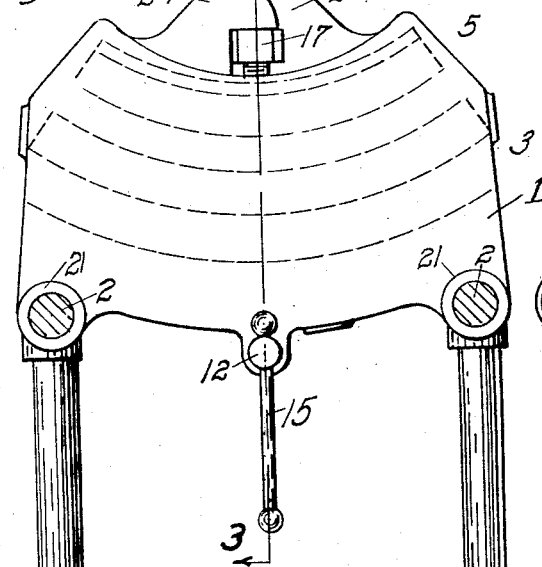
Fig. 2 is a side elevation of the vulcanizer with the front portion of the frame work cut away on the line 2—2 of Fig. 1.
Figure 6:
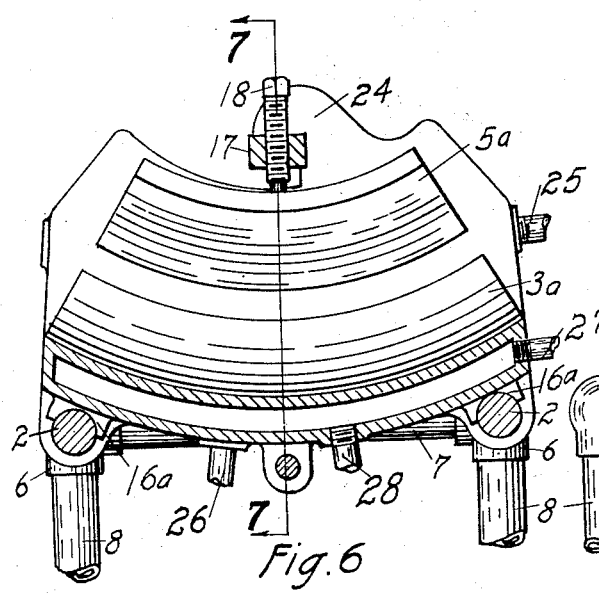
Fig. 6 is a detailed side elevation of the apparatus in section as cut along the line 6—6 of Fig. 7.
Figure 7:
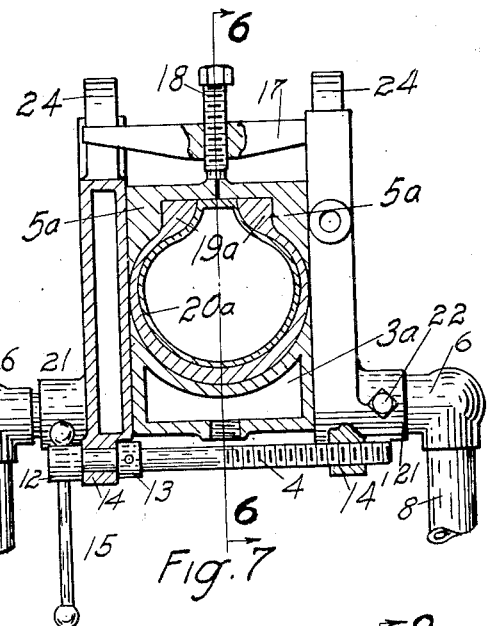
Fig. 7 is a detailed end elevation of the vulcanizer in partial section as cut along the line 7—7 of Fig. 6. Except that it shows the apparatus adjusted for a much larger tire casing, this figure is, in every way, the duplicate of Fig. 3.
Figure 8:
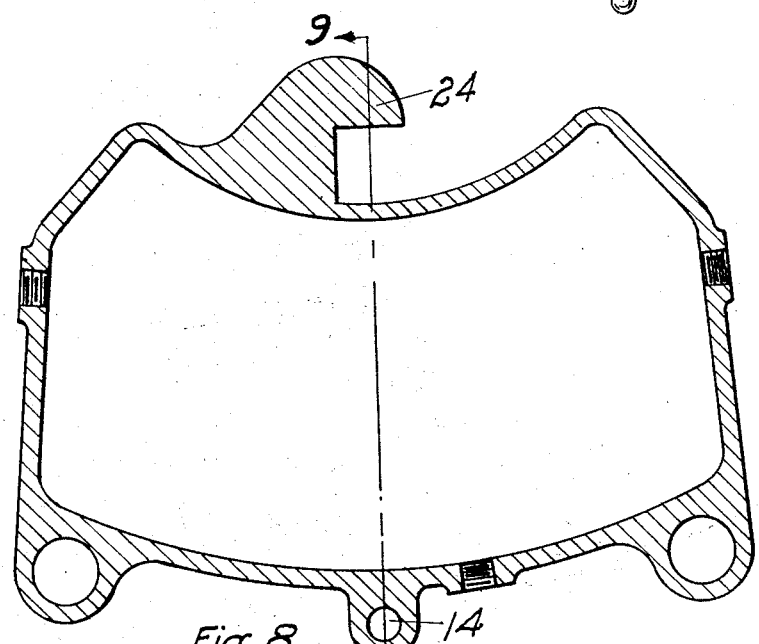
Fig. 8 is a side elevation in section of the hollow side wall of the vulcanizer as cut along the line 8—8 of Fig. 9.
Figure 9:
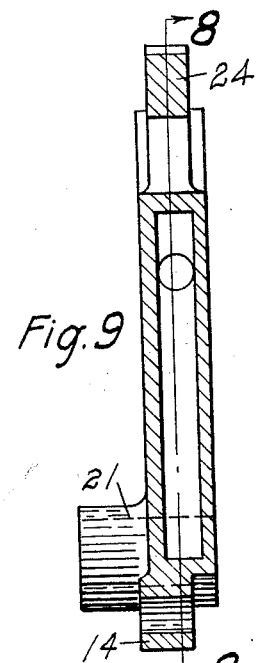
Fig. 9 is a detailed sectional end elevation of the hollow side wall of the vulcanizer cut along the line 9—9 of Fig. 8.

The tire casing is shown in place in the vulcanizer at 19, Fig. 3, and 19ª, Fig. 7. Similarly the air bags are shown at 20 and 20ª, in their respective casings. The supporting lugs of the tread molds are shown at 16, Fig. 5, and at 16ª, Fig. 6. These lugs are of various lengths, being longer for the small casing and shorter for the large casings to the end that the bead mold will be supported at a point close to the top of the side walls in each case, thereby reducing the required adjustment of the screw 18 to a minimum.

Steam connections are indicated with short pieces of pipe with the ends thereof broken at 25, 26, 27 and 28 respectively, Fig. 6. Steam enters the side wall at 25 and is connected to the lower portion of the boiler by the pipe 26, the connection to the lower portion of the boiler being arranged in order that any condensate may return by gravity. Similarly the steam enters the tread mold 3 at 27, passing therefrom by the pipe 28.

In the operation of the apparatus, let us assume that it is first to be adjusted to a new size of tire from that for which it has formerly been set. The adjustment is made by quickly detaching the hose connections to the steam lines, then slackening the pressure of the side wall 1, against the tread mold 3, by turning the screw 4 in a counterclockwise direction. The tread mold employed for the tire for which the mold has been set is removed, and the new size inserted, the side wall 1 is clamped against the tread mold 3, and the couplings for the steam connections snapped into place, the whole being accomplished in about the time required to describe the operation. No hose connections are shown in the drawings as there are a number of quick-acting couplings available, any one of which will fulfill the requirements of the apparatus. The apparatus is now ready for the new size of tire casing. The steam is allowed to flow through the hollow spaces of the side walls and tread mold until the mold has been brought to the required temperature. In making the adjustment, the lugs 16, 16ª are adapted to readily locate the tread mold in the correct relation to the side walls, and no time is lost in adjusting the position of the tread mold nor in tightening up a multitude of bolts. The mold having reached the required temperature, the tire casing with the inflated air bag in place is inserted between the walls 1, 1' and against the mold 3, the bead molds 5, 5 placed against the bead of the casing, the clamp is slipped beneath the lugs 24, and the screw 18 is turned against the bead mold to the end that the casing is forced into close contact with the heated side walls 1, 1' and the heated tread mold 3.

In the ordinary vulcanizer which is in common use generally for the repair of tire casings, the side walls of the vulcanizer are cast integral with the bottom hollow portion thereof the bottom being interiorly curved to conform to the approximately cylindrical tread portion of the casing. In such vulcanizers, the tire casing to which a repair patch or a renewed wearing surface of rubber composition has been applied previously, is set within the mold and clamped in place as described for the operation of my improved vulcanizing apparatus. In such vulcanizers, it is necessary to provide as many sizes as there are sizes of tire casings to be vulcanized except that one size of vulcanizer may be made to make shift for two sizes of casings.

In certain vulcanizers of the adjustable type, the hollow side walls and the tread mold are made separate pieces, but the tread molds are cast solid without steam space, heat being conducted to the tread mold through the metal from the side walls, the loss of temperature, due to this method of heating the tread mold, reducing the efficiency of the apparatus. In other certain vulcanizers, fitted with hollow tread molds, the steam space in the said tread molds is connected with the steam space in the side walls by means of pipe nipples supplied with gaskets and such joints must be broken and renewed each time the vulcanizer is changed from one size of casing to another. Such joints are subject to leakage and must frequently be renewed. In practically all separable vulcanizers made heretofore, the parts are connected with a multiplicity of bolts and clamps to the end that quick change from one size to another is not attainable therewith. In the combination of parts embodied in my invention herein described, the objectionable features have been eliminated.

In the drawings I have shown a frame work made of pipe fittings, the parallel horizontal members 2, preferably made from steel shafting, the shafting being suitably threaded to screw into the elbows 6, and these elbows, in their turn, being connected by the horizontal pipes 7, the supporting members being comprised of the four vertical pipes 8, to the lower ends of which are screwed the floor flanges 9. I do not confine myself to this construction, and it is obvious that a suitable frame or stand for my vulcanizer may be made in a variety of ways without departing from the spirit and the purpose of my invention.

The apparatus shown and described is capable of considerable modification without departing from the spirit of my invention.

I claim:

1. In a vulcanizer, the combination of a main frame comprised of vertical and horizontal bars, said bars having circular cross-sections, vulcanizer members slidable on the horizontal bars of said frame, and a screw mounted entirely in the said vulcanizer members for the purpose of drawing said members together.

2. A vulcanizer comprising a pair of parallel disposed hollow side walls, a plurality of hollow tread molds adapted to be clamped between said side walls, lugs on said tread molds, said lugs being adapted to locate said tread molds in the proper operating position between said side walls, and means for clamping said side walls against said tread molds.

3. A vulcanizer comprising a frame a pair of hollow side walls, one of said side walls being fixed in position on said frame a lug on said fixed wall, the other side wall being slidably mounted on said frame, a female screw thread being tapped in said lug, a smooth-bored lug on the slidable side wall, a clamping screw adapted to screw into the threaded lug on the fixed side wall, and adapted to turn freely in the lug on the slidable side wall, stop collars on said screw, a handle on said screw adapted for turning same, said screw being adapted to move said slidable side wall toward or away from the fixed side wall.

In witness whereof, I have hereunto affixed my signature.

EDWIN RUDOLPH GEWERT.